Jan. 23, 1968 C. E. DUNLAP 3,365,057
WEIGHING AND SORTING APPARATUS
Filed Sept. 30, 1965 5 Sheets-Sheet 1
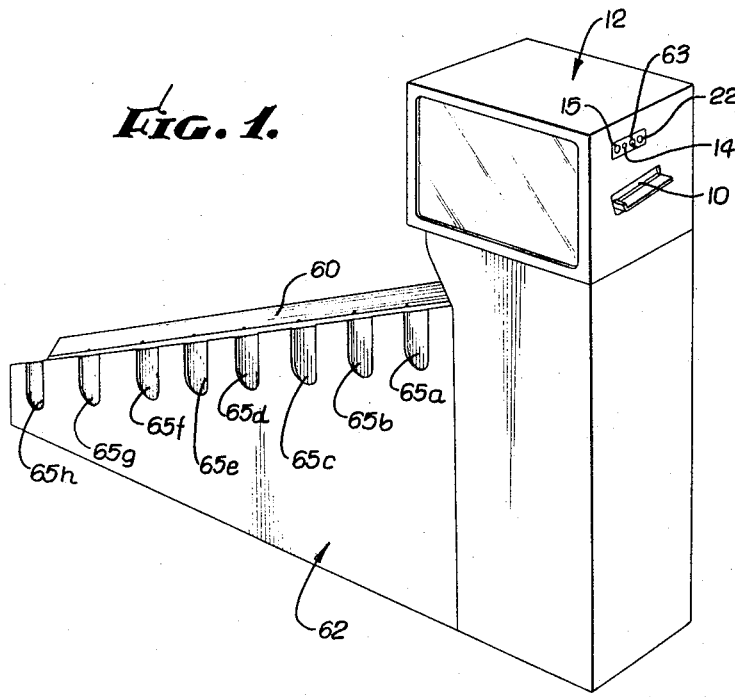
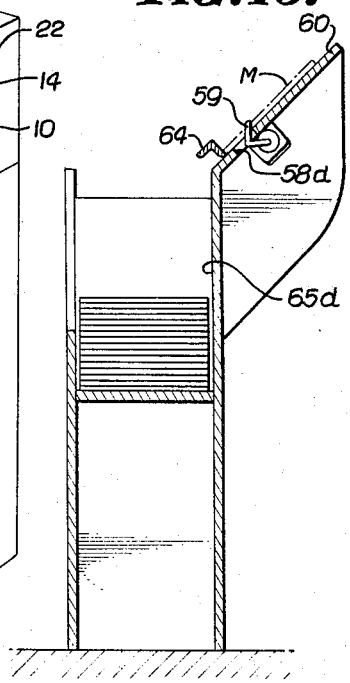
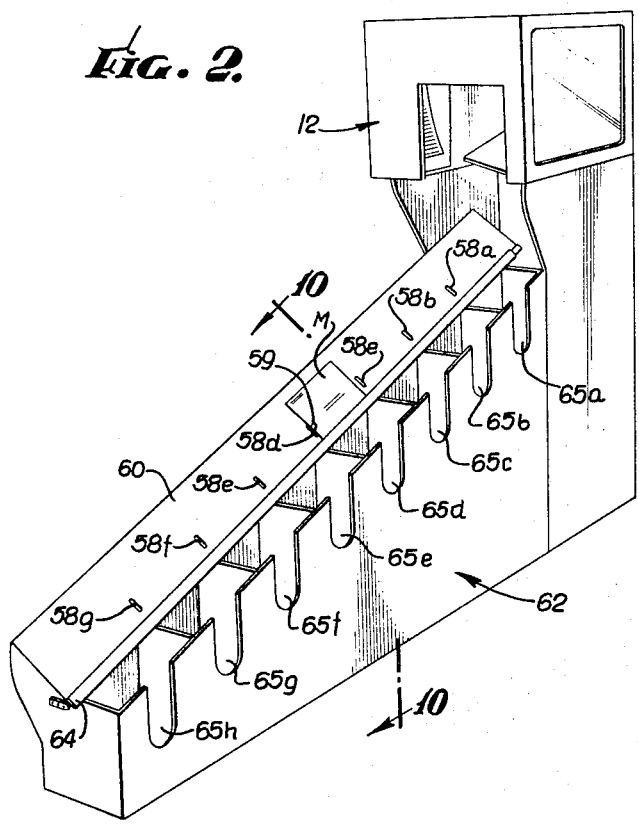
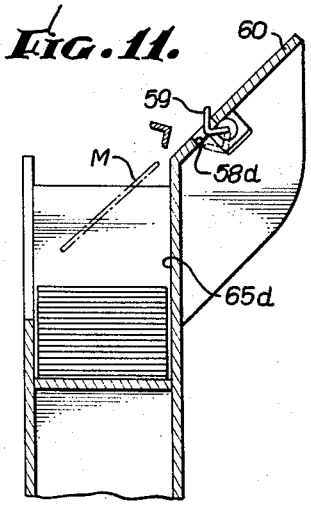
INVENTOR.
CLIFFORD E. DUNLAP
BY Huebner & Worrel
ATTORNEYS.

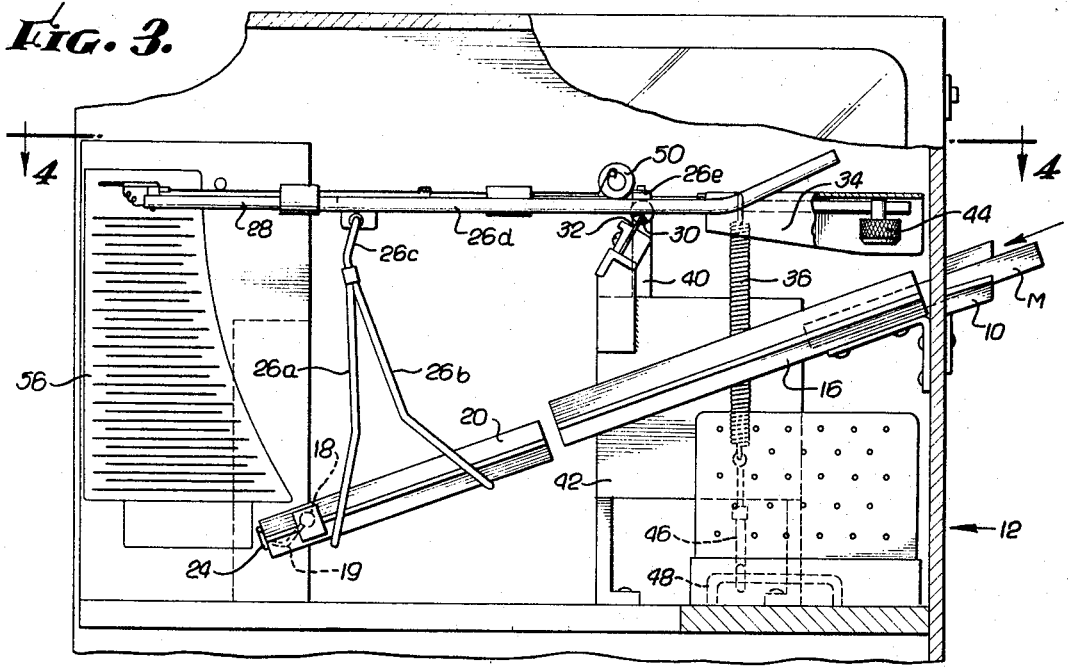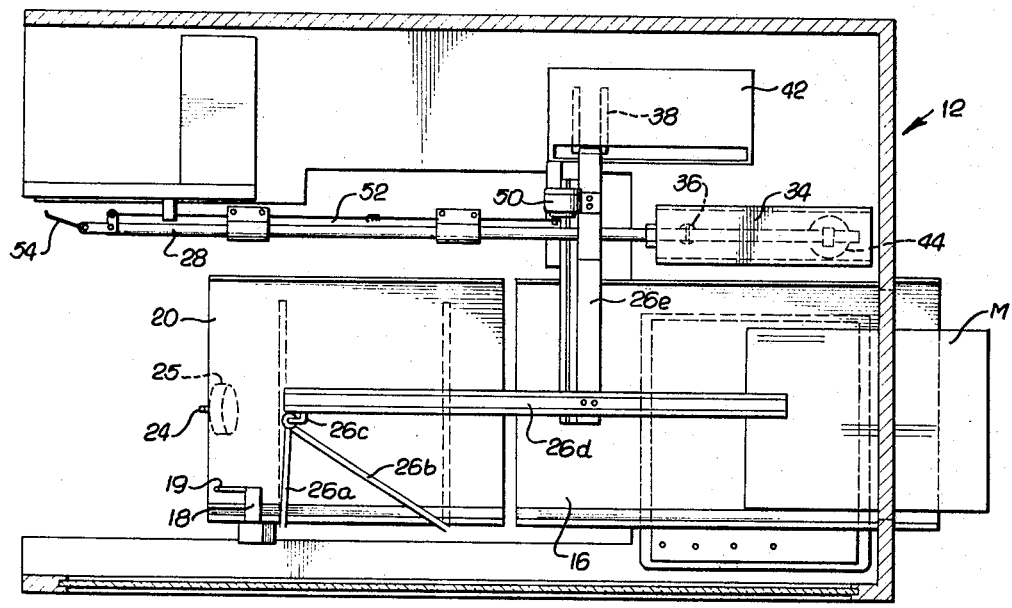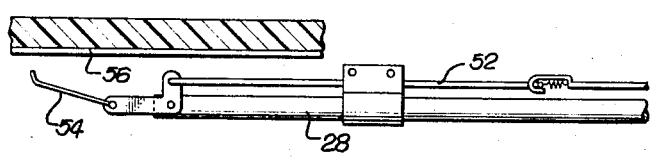

Jan. 23, 1968  C. E. DUNLAP  3,365,057
WEIGHING AND SORTING APPARATUS
Filed Sept. 30, 1965  5 Sheets-Sheet 3
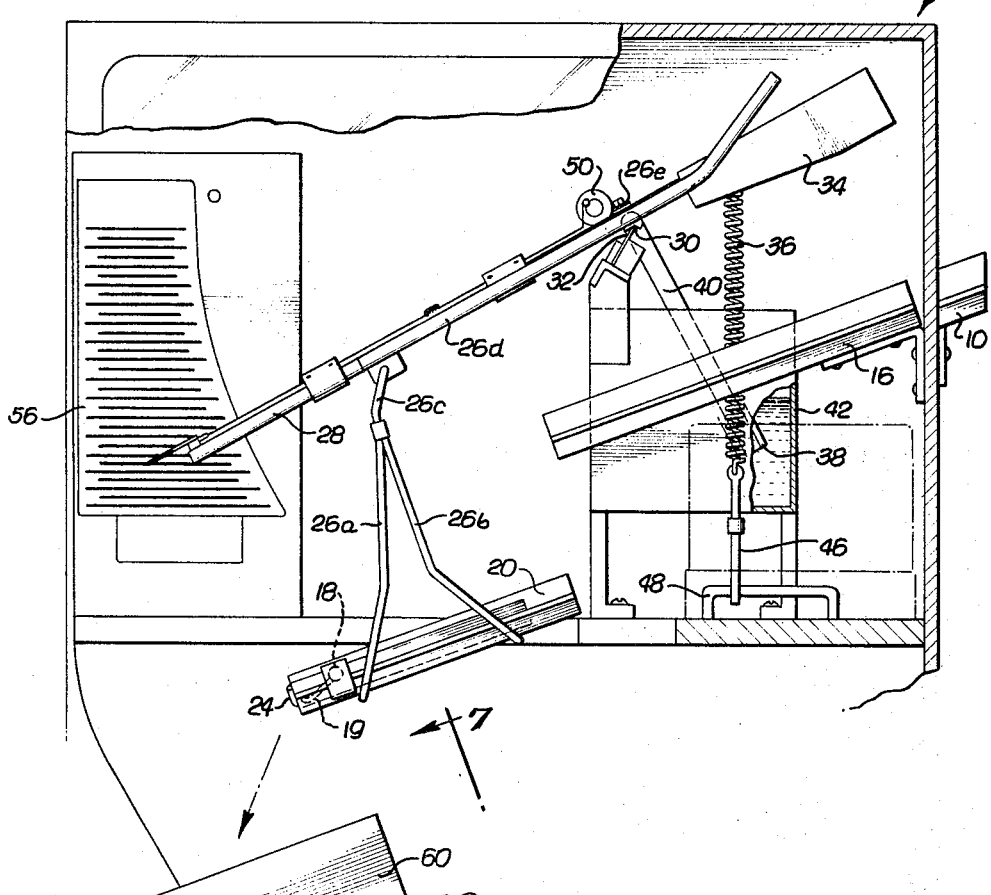
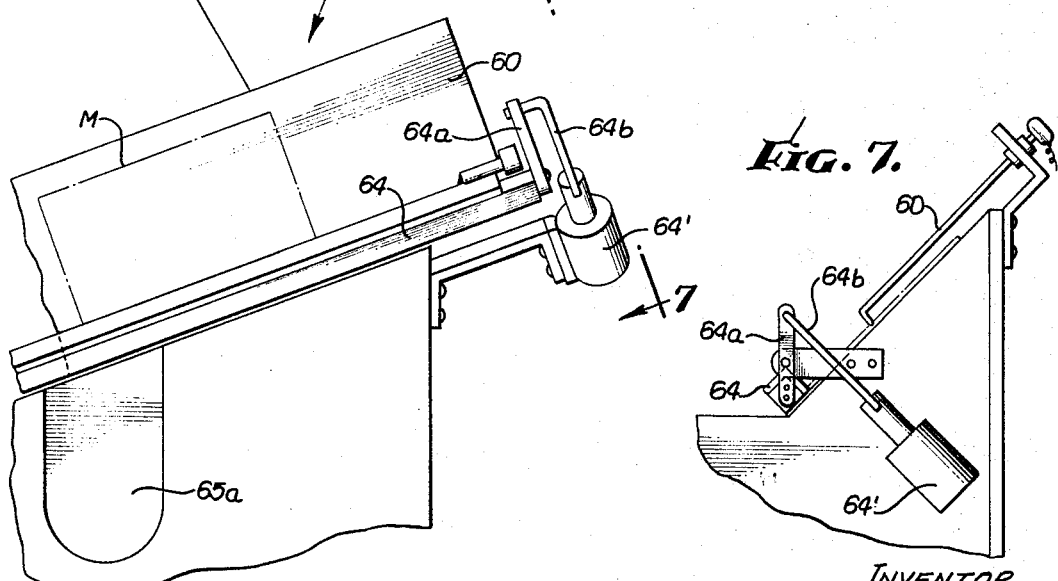
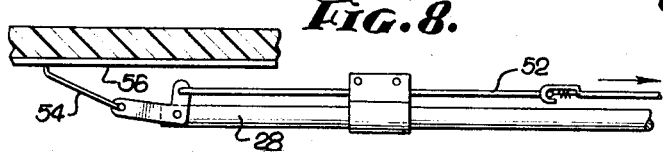
INVENTOR.
CLIFFORD E. DUNLAP
BY Huebner & Worrel
ATTORNEYS.

Jan. 23, 1968  C. E. DUNLAP  3,365,057
WEIGHING AND SORTING APPARATUS
Filed Sept. 30, 1965  5 Sheets-Sheet 4

Fig. 9.

INVENTOR.
CLIFFORD E. DUNLAP
By Huebner & Worrel
ATTORNEYS.

Jan. 23, 1968    C. E. DUNLAP    3,365,057
WEIGHING AND SORTING APPARATUS
Filed Sept. 30, 1965    5 Sheets-Sheet 5
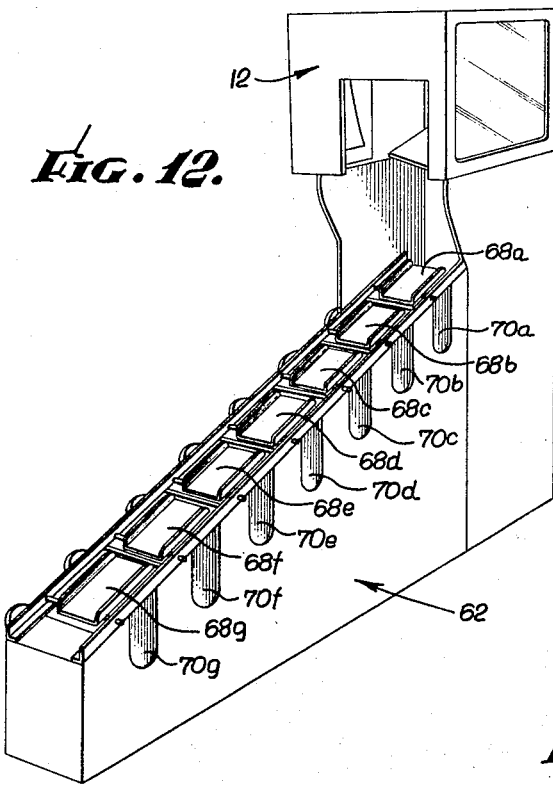
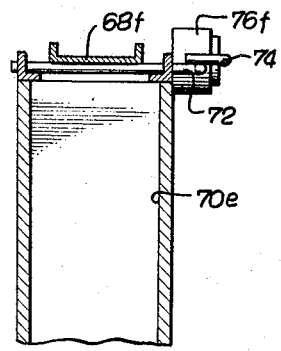
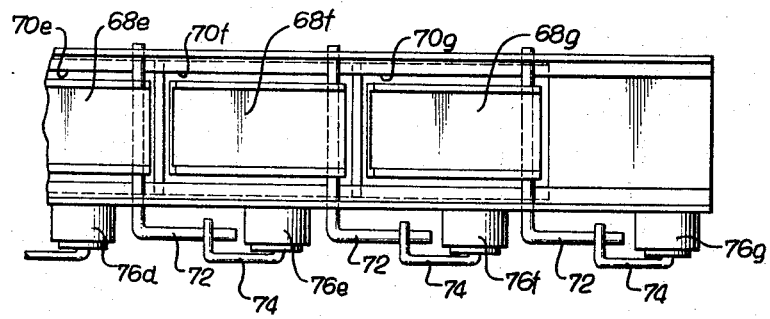
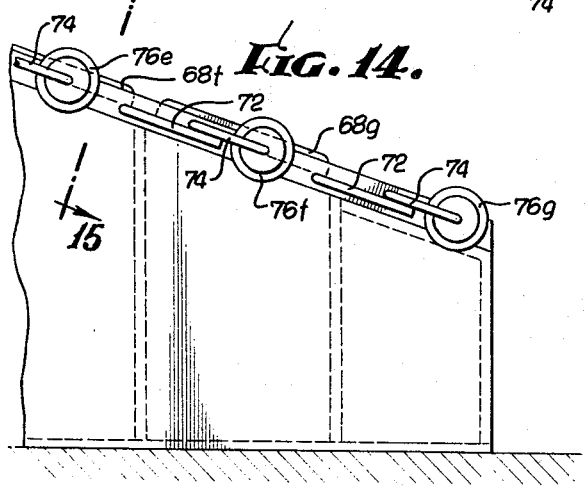
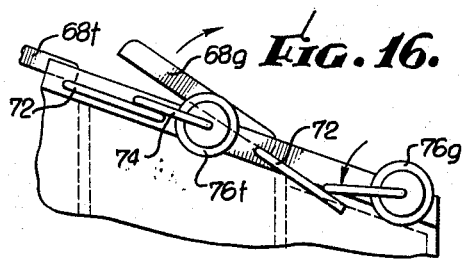
INVENTOR.
CLIFFORD E. DUNLAP
By Huebner & Worrel
ATTORNEYS United States Patent Office 3,365,057
Patented Jan. 23, 1968

3,365,057
WEIGHING AND SORTING APPARATUS
Clifford E. Dunlap, Pasadena, Calif., assignor to Ambassador College, Pasadena, Calif., a non-profit corporation of California
Filed Sept. 30, 1965, Ser. No. 491,620
8 Claims. (Cl. 209—121)

ABSTRACT OF THE DISCLOSURE

Apparatus for sorting articles according to weight. Slide apparatus gravity feeds each article to a scale, and thence adjacent a series of receptacles. The slide apparatus has a stop means associated with each receptacle for selectively stopping articles adjacent the respective receptacles, and incremental switching means actuated by the scale determines which stop means is actuated according to the weight of an article on the scale. Control means holds the article on the scale until the switching means has had sufficient time to actuate the appropriate stop means, and then releases the article from the scale.

---

This invention relates to weighing and sorting apparatus, and in particular to apparatus which combines a weighing scale and separate receptacles for different weight categories of articles in communication with the weighing scale.

The development of article weighing and sorting machines that utilize complicated mechanisms has brought increasing breakdowns of such machines. As a result, time and money are wasted due to frequent repairs and maintenance of the machines. Although some articles which are to be sorted by weight may require complicated machines to do the job properly, often such complexity is not necessary. For example, literature which is to be mailed merely needs to be separated by weight in accordance with corresponding variations in postal rates. In addition, a machine adapted to this purpose must provide a means for quickly moving generally lightweight, flat mail from the weighing portion of the apparatus to the portion of the apparatus where it is sorted. When automated, the various functions of the machine need to be coordinated, so that articles are properly sorted according to predetermined weight differences.

Therefore, it is a primary object of this invention to provide a relatively uncomplicated apparatus for automatically separating articles according to weight that is especially suitable for sorting mail by weight categories which correspond to various postal rates.

Another object of this invention is to provide an accurate weighing and sorting machine, which is readily adaptable to a number of different weight classifications.

A further object of this invention is to provide weighing and sorting apparatus, in which the weighing operation is nearly frictionless.

A still further object of this invention is to provide a weighing and sorting apparatus utilizing a freely floating weighing scale, and sorting means responsive to different rest positions of the weighing scale.

Other objects and advantages of this invention will become apparent from the following illustrative description.

According to this invention, the improved weighing and sorting apparatus includes a weighing unit and a sorting unit which are associated with each other in such a manner that articles to be sorted are weighed by a scale which actuates responsive sorting means that, in turn, separates articles according to weight. A primary slide is disposed in the weighing unit inclined so that articles thereon slide onto an adjacent inclined weighing scale pan. An arm of the weighing scale actuates a stop means in a secondary slide which corresponds to a predetermined weight category receptacle. The upper end of an inclined secondary slide is positioned under the scale pan so that articles will fall onto it and slide until they are stopped over the proper receptacle under the secondary slide. A releasing means is provided in the secondary slide, so that articles will drop into the proper receptacles through openings therein. Since some amount of time is required for the article to be weighed, means are provided to delay actuation of the stop means in the secondary slide and the release of the article from the scale pan until weighing is completed. Release of the article from the secondary slide is also delayed until the article reaches the proper stop means. Means are provided for delaying the closing of the releasing means until the article being sorted has dropped into its proper receptacle.

A preferred form of the invention is illustrated in the accompanying drawings wherein:

FIGURE 1 is a perspective view of apparatus in accordance with this invention as seen from the weighing unit end thereof;

FIGURE 2 is another perspective view of the apparatus as seen from the sorting unit end thereof;

FIGURE 3 is a fragmented, partially-sectional view of the weighing unit showing the internal components therein;

FIGURE 4 is a top plan view of the weighing unit;

FIGURE 5 is an enlarged fragmented view of the scanner arm and contact plate in the weighing unit as shown in FIGURE 4;

FIGURE 6 is another fragmented, partially sectional view of the weighing unit as shown in FIGURE 3 with an article being weighed disposed above a partly fragmented view of the secondary slide;

FIGURE 7 is an end elevational view of the secondary slide taken along 7—7 in FIGURE 6;

FIGURE 8 is an enlarged fragmented view of the scanner arm in the weighing unit showing the contactor touching the contact plate;

FIGURE 9 is a diagrammatic view of typical circuitry used in the apparatus;

FIGURE 10 is a sectional view of the sorting unit taken on line 10—10 in FIGURE 2, showing a stop unit and the drop gate in closed position;

FIGURE 11 is another sectional view of a sorting unit similar to FIGURE 10, but with the drop gate open and a stop unit shown open in phantom;

FIGURE 12 is a perspective view of the apparatus taken near the sorting unit end thereof, showing a modified embodiment of the secondary slide;

FIGURE 13 is a fragmented top plan view of the secondary slide shown in FIGURE 12;

FIGURE 14 is a fragmented side elevational view of the sorting unit embodiment shown in FIGURE 13;

FIGURE 15 is a fragmented sectional view of the sorting unit taken through 15—15 in FIGURE 14; and FIGURE 16 is a fragmented side elevational view of the secondary slide in FIGURE 14, showing a slide plate opening.

With reference to the drawings, articles such as Mail M, which are to be separated into predetermined weight categories, are inserted into slot 10 of weighing unit 12.

The electrical system for the apparatus is activated by turning on switch 14, which is indicated by red light 15. After an article being weighed slides down inclined primary slide 16, best viewed in FIGURES 3 and 6, it trips microswitch 18 in adjacent inclined scale pan 20 into which the article has slid from primary slide 16. This simultaneously turns on yellow in-use light 22 and activates a primary function time delay circuit to be described later. Pan 20 is preferably inclined at the same angle as slide 16 so as to provide an aligned sliding surface.

The physically contacted part of microswitch 18 is a pivotally mounted arm 19 which is preferably disposed in scale pan 20 so that switch 18 will continue to be actuated so long as an article remains therein. A gate 24 at the lower end of the scale pan 20 stops the article being weighed from sliding further until opened after a predetermined delay by the primary function time delay circuit actuating an interconnected gate solenoid 25.

Scale pan 20 is suspended by means of interconnecting members 26a, 26b, 26c, 26d and 26e from a scanner arm 28, which is, in turn, pivotally supported at balance point 30 on upwardly extending knife projection 32 of weighing unit 12. Scanner arm 28 and the interconnected scale pan 20 are balanced by a counterweight 34 attached to the opposite end of scanner arm 28 in such a manner that when scale pan 20 is empty it will be disposed adjacent primary slide 16, as shown in FIGURE 3. When an article drops into scale pan 20, it will descend as shown in FIGURE 6, and oscillate until it comes to rest at its new balance position. The swinging oscillation is limited by a spring 36 connected between counterweight 34 and a stationary element 48 of the weighing unit 12, and damped without interfering with the weighing operation by a damper vane 38. Damper vane 38 is a paddle extension of a damper arm 40 extending from scanner arm 28 into a body of oil carried by a receptacle 42. The desired balancing effect of counterweight 34 can be regulated by positioning a fine adjustment knob 44 on scanner arm 28 and by shifting a turnbuckle 46 attached to spring 36 laterally along bar (stationary element) 48.

The primary function delay circuit is timed so that after scanner arm 28 stops oscillating a solenoid 50 will be energized so as to cause a connected linking arm 52 on scanner arm 28 to move an electrical contactor 54 which is pivotally mounted near the end of the scanner arm 28 remote from counterweight 34. Disposed in a plane adjacent and parallel to the plane in which contactor 54 swings is a multiple contact plate 56 comprised of a series of electrically separate increments which take the form of a plurality of contact wires. Each of the contact wires is connected so as to be able to electrically actuate a solenoid for a separate stop means in a secondary slide 60, an example of one being shown at 59 which, in turn, causes a portion of the stop means to project through slots 58a to 58g in the secondary slide 60 of a sorting unit 62. As an example, a portion of actuated stop means 59 is shown projecting through slot 58c in FIGURES 2, 10 and 11. When actuated, the other identical stop means (not shown) operate in the same manner as stop means 59. When contactor 54 is pivotally moved by linking arm 52 it touches a contact wire on contact plate 56 and completes a circuit with one of the solenoids in the secondary slide which, in turn, actuates the stop means with which it is associated.

Additionally, when contactor 54 touches contact plate 56 a secondary function time delay circuit is activated and gate 24 on the scale pan is opened so that the article being weighed will drop onto inclined secondary slide 60 and slide thereon until it comes to rest against a projecting stop means such as 59. Secondary slide 60 is inclined downwardly and also transversely canted toward its longitudinal edge which is abutted by a drop gate 64 pivotally mounted on a stationary element of sorting unit 62.

While an article remains in scale pan 20 the yellow in-use light 22 remains on, indicating to the operator that another article is not to be inserted into the machine. When contactor 54 touches a wire of contact plate 56, in-use light 22 is turned off and the machine is ready to receive another article. Though the secondary function time delay sequentially follows the primary function time delay for each article being weighed and sorted, the secondary function may overlap the primary function of another article being weighed. However, there is no conflict of operation in such a situation, because the secondary function is slightly shorter in time delay than the primary time delay.

Should contactor 54 fail to contact a wire on contactor plate 56 at the end of the time lapse caused by the primary function time delay circuit, yellow in-use light 22 will remain on so that the operator is informed by the excessive delay that there has been a malfunction. In such a case, reset switch 63 is provided to re-initiate the primary function time delay.

At the expiration of a period of time long enough to allow the article to reach a stop means, the secondary function time delay circuit causes drop gate 64 to open by actuating solenoid 64', linked thereto by arms 64a and 64b, so as to allow the article to fall into one of the receptacles, 65a through 65h, which is associated with the actuated stop means.

As an article drops from scale pan 20, arm 19 of microswitch 18 is released so as to neutralize the primary function time delay circuit and as the article slides down secondary slide 60 the scale returns to the position shown in FIGURE 3, so that the weighing unit is ready to receive another article. Opening of drop gate 64 activates a microswitch (not shown) which terminates the secondary function. The return of drop gate 64 to its closed position is delayed long enough to allow the article to drop from slide 60 into the underlying receptacle.

Another form of sorting unit 62 is shown in FIGURES 12 to 16. Instead of secondary slide 60 as in the previously described embodiment, a series of pivotally mounted slide pans 68a to 68g form a slide which is disposed over receptacles 70a to 70g. Associated respectively with each of these movable pans, by means of contacting arms 72 projecting from each of the pans, are arms 74 of solenoids 76a to 76g. These solenoids are, in turn, electrically connected to contact plate 56, and are each independently actuated when contactor 54 touches a responsively associated part of contact plate 56. When arm 74 of the actuated solenoid is pivoted so as to press arm 72 of an adjacent pan, the opposite end of the pan is lifted as shown in FIGURE 16. Thus, an article is stopped from sliding past the lifted slide pan (which acts as a stop means) and the article falls through into the underlying receptacle.

Since articles which are being weighed and sorted are to slide down the primary slide, scale pan, and secondary slide to the appropriate receptacle in the sorting unit, it is necessary that the slide surfaces be reasonably smooth and inclined at a sufficient angle to facilitate sliding. In the particular embodiment shown, pamphlets and similar items weighing roughly one to eight ounces slide on the different portions of the apparatus when the slides thereof are inclined about 25°. It might be found that for other articles a different angle of inclination would be more suitable. Optionally, in order to accelerate movement of articles down the secondary slide a rotating rubber wheel (not shown) disposed at the upper end of the secondary slide can be used to "kick" articles down the secondary slide.

An example of a circuit which is suitable for the operation of apparatus with the form of sorting unit shown in FIGURES 12–16 is illustrated by the schematic diagram shown in FIGURE 9.

The power used in the system illustrated is twelve-volt direct current supplied to the system as indicated in the drawing although other power supplies could be used. The system is initially energized by closing on-off switch 14. When turned on, this is indicated by light emitted from red light 15. An article sliding into scale pan 20 then closes normally open microswitch 18, which actuates the primary function time delay circuit, the activation of which is indicated by turning on yellow in-use light 22. Current will then flow through variable resistor R–1, capacitor C1 and time delay relay K2, which initiates the primary function time delay. Meanwhile, scale pan 20 is oscillating due to the weight of the article which has been dropped into it and interconnected scanner arm 28 ranges in on adjacent contact plate 56.

The primary function time delay lasts just long enough (usually one to two second) for scanner arm 28 to stop oscillating. Time delay relay K2 then closes circuits through contactor actuator K4 and latching relay K3. Contactor 54 is actuated by contactor actuator K4, (solenoid 50) so that it is pivoted to touch contact plate 56 as shown in FIGURE 8, and thus close a circuit with one of the latching relays K6 through K12. These relays are each associated with one of the solenoids 76a through 76g (which is a normally closed common ground circuit in the example shown) so that one of the slide plates 68a through 68g is opened in the manner previously described.

Though the contactor might complete a circuit with any of the relays in this example a circuit is shown completed with relay K10. Then, current in the secondary function time delay circuit will flow through variable resistor R3, capacitor C2, time delay relay K27 and resistor R4. At the same time, the circuit is completed to pan gate solenoid K5 which causes gate 24 in scale pan 20 to open thereby allowing the article being weighed to drop onto the secondary slide. This, in turn, opens microswitch 18 thereby terminating the primary function time delay circuit. After about two seconds (a sufficient time for the article being weighed to drop through the appropriate opening in the secondary slide) time delay relay K27 breaks the circuit through the solenoid common ground, capacitor C2 discharges into ground through diode CR8, and the primary function time delay circuit is terminated.

The amount of delay in the various circuits can be controlled by adjusting variable resistors R1, R2, and R3. If contactor 54 does not contact a relay within the normal delay time, the primary function time delay circuit can be reactivated by momentarily breaking the circuit via reset switch 63. Diodes CR5 and CR7 provide a smoother spark across the associated relay contacts thereby reducing pitting.

The circuitry to be used for actuating the secondary slide embodiment of this invention illustrated in FIGURES 2, 6, 7, 10 and 11 is not shown, but operates on the same principle as previously described. However, instead of a single solenoid that both opens a portion of the secondary slide and serves as a stop means when actuated, separate solenoids actuate the stop means and the drop gate. A capacitive discharge delay is provided therein, so that the article being weighed reaches the raised stop means before the drop gate is opened. Once the drop gate is opened, its closure is delayed until the article drops from the secondary slide into the receptacle beneath it.

It is not considered necessary to particularize in any further detail the circuits involved, as the foregoing outline should be sufficient to any skilled electrician to reproduce the circuits to function in the manner and for the purposes described with reference to the mechanical elements of both forms of apparatus.

Though several embodiments of this invention have been described herein in detail, this invention is not to be limited thereto, but is to coextend with the scope and spirit of the following appended claims.

What is claimed is:

1. Apparatus for separating articles in accordance with predetermined weight increments comprising:
   (a) a weighing unit including means for loading articles to be weighed therein, a scale onto which loaded articles will come to rest including a pivotally supported scale pan that will swing to different rest positions in accordance with the weight placed therein, and means for transmitting predetermined incremental amounts of weight measured by said scale including a scanner arm associated with a scale pan, a movable contactor supported by said scanner arm and a contact plate close enough to said contactor that the contactor can be moved to touch it, said contactor plate including a plurality of incremental parts each of which are independently responsively connected to a stop means in the slide;
   (b) a sorting unit including a plurality of separated receptacles, a slide structure communicable with said receptacles disposed so as to receive articles from said weighing unit, and said slide structure embodying stop means associated with each of said receptacles, said stop means being independently actuated by transmission of weight increments from said scale; and
   (c) control means whereby an article being weighed is held in the scale until its weight increment is transmitted to actuate a stop means, said control means including a primary delay circuit which causes the contactor to touch the contact plate only after the scale pan comes to rest, a scale pan release gate which holds an article being weighed therein until the stop means is actuated, and a secondary delay circuit which opens communication between the slide structure and a receptacle.

2. Apparatus for separating articles in accordance with predetermined weight increments comprising:
   (a) a weighing unit including means for loading articles to be weighed therein, a scale onto which loaded articles will come to rest including a pivotally supported scale pan that will swing to different rest positions in accordance with the weight placed therein, and means for transmitting predetermined incremental amounts of weight measured by said scale including a scanner arm associated with the scale pan, a movable contactor supported by said scanner arm and a contact plate close enough to said contactor that the contactor can be moved to touch it, said contactor plate including a plurality of incremental parts each of which are independently responsively connected to a stop means in the slide;
   (b) a sorting unit including a plurality of separated receptacles, a slide structure comprising a series of pans which are pivotally movable communicable with said receptacles disposed so as to receive articles from said weighing unit, and said slide structure embodying stop means associated with each of said receptacles, said stop means being independently actuated by transmission of weight increments from said scale; and
   (c) control means whereby an article being weighed is held in the scale until its weight increment is transmitted to actuate a stop means.

3. Apparatus for separating articles according to weight, comprising:
   (a) a weighing unit, a scale supported within said weighing unit, said scale having a scanner arm upon which a movable contactor is located, a primary function microswitch and a movable release gate disposed in said scale so that articles therein actuate the microswitch and rest against the release gate, a contact plate supported within said weighing unit close enough to said contactor that said contactor can be moved to touch it, said contact plate including a plurality of separate contact elements which correspond to predetermined weight increments;
   (b) a sorting unit including an inclined slide structure, the upper end of which is disposed beneath said scale so that articles released therefrom will fall onto said slide, a plurality of receptacles disposed beneath the slide which respectively correspond to separate weight increment portions of the contact plate, stop means associated with each of said receptacles which are separately actuated to block the slide by different increments of the contact plate, and means for opening communication between the slide structure and a receptacle so that articles can fall into said receptacles; and (c) control means including a primary function delay circuit actuated by the primary function microswitch in the scale, said circuit causing the contactor to delay touching the contact plate until the scale is at rest after which time it closes a circuit which actuates a stop means and opens said communication and actuates a secondary function time delay circuit which delays closing of the communication until the article being weighed has dropped into a receptacle.

4. Apparatus for separating articles according to weight as defined in claim 3, wherein said scale includes a scale pan supported by said scanner arm and the scanner arm is a pivotally supported freely swinging lever which includes an integral damper means.

5. Apparatus for separating articles according to weight as defined in claim 4, wherein the inclined slide structure in the sorting unit comprises a series of slide pans, which are pivotally movable to provide both the stop means and communication.

6. Apparatus for separating articles according to weight comprising: a weighing unit which includes a primary slide mounted within said weighing unit for receiving and conveyng articles to be weighed, the upper end of said primary slide being accessible from the exterior of said weighing unit and said slide being inclined downwardly therefrom; a freely movable scale pan inclined at substantially the same angle as the primary slide, and having an open end disposed adjacent the lower end of the primary slide, said scale pan being pivotally supported within said weighing unit and having a releasable gate at its lower end; a scanner arm operatively associated with said scale pan, and having a contactor member at one end thereof, said scanner arm being movable in response to changes in weight in said scale pan; a contact plate comprising a plurality of contact wires, the contactor member on the scanner arm being movable to selectively engage a contact wire; a sorting unit which includes an inclined secondary slide structure disposed below the scale pan so that articles in the scale pan can drop onto the secondary slide when the release gate of the scale pan is opened, a series of spaced stop means independently movable into said secondary slide so as to block articles sliding therein, said stop means each being actuated by a separate circuit from a contact wire of the contact plate; a drop gate forming a periphery of said slide structure, said drop gate being movable to a position where articles in said secondary slide are released therefrom; separate receptacles associated with each of the stop means below the secondary slide, so that an article in the secondary slide will fall into a receptacle when the drop gate is released; and electrical control means including a switch which actuates a primary function time delay circuit disposed so as to be tripped by articles passing into the scale pan, said primary function time delay circuit causing the contactor on the scanner arm to move after a predetermined delay so as to engage a contact wire which, in turn, actuates the associated stop means in the secondary slide, and also a secondary function time delay circuit that causes release of the drop gate in the scale pan after a predetermined lapse of time.

7. Apparatus for separating articles as defined by claim 6, wherein the scanner arm is pivotally supported within the weighing unit, the scale pan is supported by the scanner arm, and damping means are provided for damping movement of the scale pan.

8. Apparatus for separating articles according to weight comprising: a weighing unit including a primary slide for receiving articles to be weighed, the upper end of said primary slide being accessible from the exterior of said weighing unit, and said slide being inclined downwardly therefrom; a freely movable inclined scale pan having an open end disposed adjacent the lower end of the primary slide, said scale pan being pivotally supported within said weighing unit and having a releasable gate at its lower end; a scanner arm operatively associated with said scale pan, and having a contactor member at one end thereof, said scanner arm being movable in response to changes in weight within said scale pan; a contact plate comprising a series of contact wires, the contactor member on the scanner arm being movable to selectively engage a contact wire; a sorting unit which includes an inclined secondary slide structure disposed below the scale pan so that articles in the scale pan can drop onto the secondary slide when the release gate of the scale pan is opened, said slide structure embodying means independently movable to block articles sliding thereon and to provide an adjacent opening through which stopped articles may drop from said slide structure, said last named means each being controlled through a separate contact wire of the contact plate; separate receptacles corresponding with each of the last named means mounted in said slide structure so that an article in said slide structure will fall into a receptacle when said last named means is positioned to provide an opening in the slide structure; and electrical control means including a switch which actuates a primary function time delay circuit disposed so as to be tripped by articles passing into the scale pan, said primary function time delay circuit causing the contactor on the scanner arm to move after a predetermined delay to engage a contact wire, which, in turn, actuates the means to block articles in the slide structure and a secondary function time delay circuit that returns the means to block articles to the original position after a predetermined delay.

References Cited

UNITED STATES PATENTS

| 1,712,700 | 5/1929 | Hardenbergh | 209—121 |
| 2,947,417 | 8/1960 | Reynolds | 209—121 |
| 3,182,737 | 5/1965 | Monsees | 209—121 |

M. HENSON WOOD, Jr., *Primary Examiner.*

R. A. SCHACHER, *Assistant Examiner.*